US010082955B2

(12) United States Patent
Doherty et al.

(10) Patent No.: US 10,082,955 B2
(45) Date of Patent: Sep. 25, 2018

(54) AUTOMATED HOME MEMORY CLOUD WITH KEY AUTHENTICATOR

(71) Applicant: International Business Machines Corporation, Armonk, NY (US)

(72) Inventors: Jessica P. Doherty, Poughkeepsie, NY (US); Heidi Lagares-Greenblatt, Jefferson Hills, PA (US); Justin A. McCoy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 14/957,697

(22) Filed: Dec. 3, 2015

(65) Prior Publication Data

US 2017/0160958 A1    Jun. 8, 2017

(51) Int. Cl.
G06F 3/06       (2006.01)
G06F 12/14      (2006.01)
G06F 17/30      (2006.01)

(52) U.S. Cl.
CPC .......... *G06F 3/0604* (2013.01); *G06F 3/067* (2013.01); *G06F 3/0608* (2013.01);
(Continued)

(58) Field of Classification Search
CPC .... G06F 3/0619; G06F 3/0604; G06F 3/0647; G06F 3/065
See application file for complete search history.

(56) References Cited

U.S. PATENT DOCUMENTS

2007/0136541 A1* 6/2007 Herz ................... G06F 11/1466
                                                         711/162
2011/0145836 A1   6/2011 Wheeler et al.
(Continued)

FOREIGN PATENT DOCUMENTS

CN    103888492 A    6/2014
WO    2014070561 A1  5/2014

OTHER PUBLICATIONS

Anonymous, "System and Method for Escalating Authentication Requirements for Cloud-accessible Devices," An IP.com Prior Art Database Technical Disclosure, Jan. 13, 2014, p. 1-2, IP.com No. 000234129.

(Continued)

*Primary Examiner* — Ryan Bertram
(74) *Attorney, Agent, or Firm* — Robert C. Bunker

(57) ABSTRACT

According to one exemplary embodiment, a method for an automatic memory cloud is provided. The method may include detecting a trigger event. The method may include activating the automatic memory cloud based on detecting the trigger event. The method may include determining if new data is found on a primary device connected to the activated automatic memory cloud, wherein the new data has a data type and a data size. The method may include selecting a destination device from a plurality of secondary devices connected to the activated automatic memory cloud based on determining that the new data is found on the primary device, whereby the selected destination device has an available storage exceeding the data size and a usage type matches the data type associated with the new data. The method may include sending an instruction to transfer the new data from the primary device to the destination device.

10 Claims, 5 Drawing Sheets

(52) U.S. Cl.
CPC .......... *G06F 3/0647* (2013.01); *G06F 3/0649* (2013.01); *G06F 12/1466* (2013.01); *G06F 17/30082* (2013.01); *G06F 2212/1052* (2013.01)

(56) References Cited

U.S. PATENT DOCUMENTS

| | | | | |
|---|---|---|---|---|
| 2011/0307573 | A1* | 12/2011 | Lingafelt | G06Q 10/10 709/217 |
| 2012/0226663 | A1* | 9/2012 | Valdez Kline | G06F 17/30091 707/640 |
| 2012/0246267 | A1* | 9/2012 | Mallet | G06Q 50/01 709/217 |
| 2013/0041931 | A1 | 2/2013 | Brand | |
| 2013/0212207 | A1 | 8/2013 | Ong | |
| 2014/0003340 | A1 | 1/2014 | Park et al. | |
| 2014/0188803 | A1* | 7/2014 | James | G06F 17/30174 707/638 |
| 2014/0189803 | A1* | 7/2014 | Chakra | G06F 3/005 726/4 |
| 2014/0279896 | A1* | 9/2014 | Branton | G06F 17/30581 707/634 |
| 2015/0355855 | A1* | 12/2015 | Cronin | G06F 3/0619 711/162 |
| 2016/0150014 | A1* | 5/2016 | Yliaho | G06F 17/30115 709/216 |
| 2017/0155715 | A1* | 6/2017 | Mukherjee | H04L 67/1095 |

OTHER PUBLICATIONS

IBM, "A Secure Method to Protect Confidential Data by Storing and Retrieving Files in Pieces in Cloud Computing," An IP.com Prior Art Database Technical Disclosure, Mar. 6, 2009, p. 1-13, IP.com No. 000180286.

Mell et al., "The NIST Definition of Cloud Computing," National Institute of Standards and Technology, Sep. 2011, p. 1-3, Special Publication 800-145.

Owncloud, "Access your data from all your devices, on an open platform you can extend and modify," ownCloud Server 8.1, p. 1-3, https://owncloud.org/, Accessed on Oct. 2, 2015.

IBM, "List of IBM Patents or Patent Application Treated as Related (Appendix P)," Aug. 1, 2016, p. 1-2.

Doherty et al., "Automated Home Memory Cloud With Key Authenticator," Application and Drawings, filed Jun. 29, 2016, 30 Pages, U.S. Appl. No. 15/196,089.

\* cited by examiner

AUTOMATED HOME MEMORY CLOUD WITH KEY AUTHENTICATOR

BACKGROUND

The present invention relates generally to the field of computing, and more particularly, to memory clouds.

Many of the devices used by people on a daily basis have limited storage capacity. As people use their personal electronic devices to create and gather data, such as taking pictures with a smartphone, the limitations of local storage space become apparent. Transferring data to public cloud services may make data vulnerable to malefactors.

SUMMARY

According to one exemplary embodiment, a method for an automatic memory cloud is provided. The method may include detecting a trigger event. The method may also include activating the automatic memory cloud based on detecting the trigger event. The method may then include determining if new data is found on a primary device connected to the activated automatic memory cloud, whereby the new data has a data type and a data size. The method may further include selecting a destination device from within a plurality of secondary devices connected to the activated automatic memory cloud based on determining that the new data is found on the primary device, whereby the selected destination device has i) an available storage exceeding the data size and ii) a usage type associated with the selected destination device matches the data type associated with the new data. The method may also include sending an instruction to transfer the new data from the primary device to the selected destination device.

According to another exemplary embodiment, a computer system for an automatic memory cloud is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may also include activating the automatic memory cloud based on detecting the trigger event. The method may then include determining if new data is found on a primary device connected to the activated automatic memory cloud, whereby the new data has a data type and a data size. The method may further include selecting a destination device from within a plurality of secondary devices connected to the activated automatic memory cloud based on determining that the new data is found on the primary device, whereby the selected destination device has i) an available storage exceeding the data size and ii) a usage type associated with the selected destination device matches the data type associated with the new data. The method may also include sending an instruction to transfer the new data from the primary device to the selected destination device.

According to yet another exemplary embodiment, a computer program product for an automatic memory cloud is provided. The computer program product may include one or more computer-readable storage devices and program instructions stored on at least one of the one or more tangible storage devices, the program instructions executable by a processor. The computer program product may include program instructions to detect a trigger event. The computer program product may also include program instructions to activate the automatic memory cloud based on detecting the trigger event. The computer program product may then include program instructions to determine if new data is found on a primary device connected to the activated automatic memory cloud, whereby the new data has a data type and a data size. The computer program product may further include program instructions to select a destination device from within a plurality of secondary devices connected to the activated automatic memory cloud based on determining that the new data is found on the primary device, whereby the selected destination device has i) an available storage exceeding the data size and ii) a usage type associated with the selected destination device matches the data type associated with the new data. The computer program product may also include program instructions to send an instruction to transfer the new data from the primary device to the selected destination device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
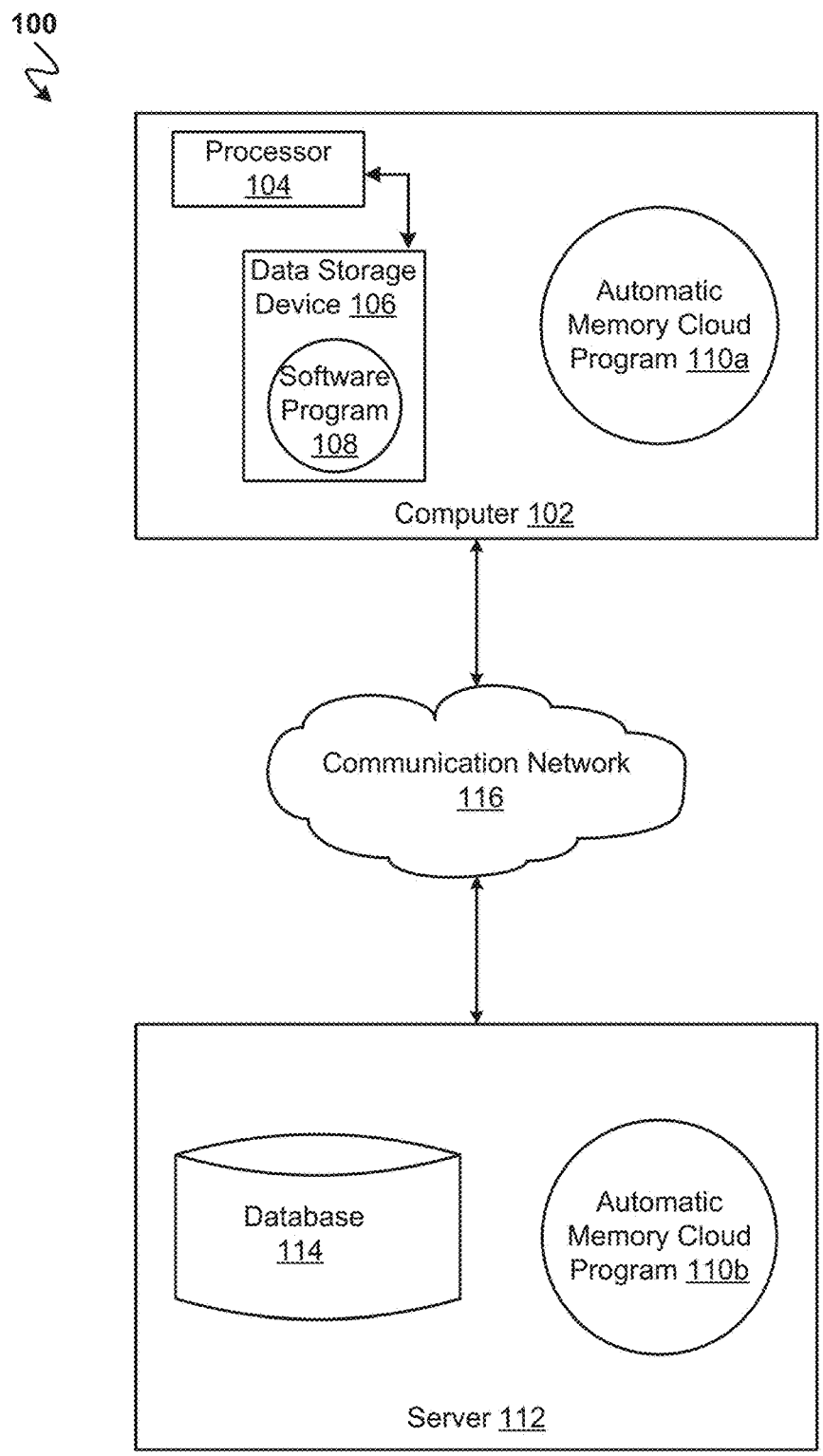
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for an automated private memory cloud with a key authenticator. As such, the present embodiment has the capacity to improve the technical field of memory clouds by utilizing unused memory in electronic devices located within a specific area. More specifically, the memory of multiple electronic devices may be pooled and connected via a private cloud that may determine how to automatically distribute data to better utilize free memory and store data on devices more suitable for the specific data. Furthermore, the private cloud may be activated and data distribution to devices within the cloud may be initiated automatically based on trigger event.

As described previously, many of the devices used by people on a daily basis have limited storage capacity. As people use their personal electronic devices to create and gather data, such as taking pictures with a smartphone, the limitations of local storage space become apparent. Transferring data to public cloud services may make data vulnerable to malefactors.

A person may have additional secondary electronic devices that may connect to a network and have storage space, such as a digital picture frame or a smart television. The person's secondary devices may have unused storage space that may not be utilized while the storage capacity on the person's primary device(s), such as a smartphone, may be overtaxed.

Therefore, it may be advantageous to, among other things, provide a way to utilize available storage capacity between multiple devices by automatically distributing data to devices within a location-specific private memory cloud.

According to at least one embodiment, an automated location-specific private memory cloud (e.g., located at a user's home, a business, an office, etc.) may be implemented by allowing devices (e.g., a smartphone, wearable technology, etc.) to exchange data within a network associated with the memory cloud based on key authentication. Key authentication may occur when a primary device, such as a smartphone, uses a key to identify which other secondary devices the primary device has access to send and receive within the private memory cloud. Once the primary device joins the private memory cloud network, the primary device may broadcast the primary device's availability to the private memory cloud when joining the private memory cloud. The secondary devices (i.e., the rest of the devices not including the primary device) connected to the private memory cloud may respond to the broadcast with metadata, such as what information may be available to be transferred to/from the secondary device and the available storage capacity the secondary device may have. If a predefined trigger event is detected (e.g., the primary device enters a predefined geographic area), the cloud may automatically activate and a process may identify and route/download data to secondary devices within the private memory cloud that matches the use of the identified data.

The devices used within the cloud (i.e., primary and secondary devices) may be connected to an indoor network (e.g., within a user's home) and may share storage information with each other device. Data may be stored locally within the user's devices and, using the present embodiment, data may be routed through a specific device depending on the device's usability. The device's usability may be determined by tags, rules, analytics of the data, smart analytics, cognitive engine, etc.

Additionally, the memory cloud may also automatically activate by determining that the primary device's available memory storage falls below a threshold value. The primary device may then download data to a selected target device's memory to free space for the action, or the primary device may use the memory of the target device to create the action, whereby the data being routed/downloaded may stay within the devices at the cloud's location (e.g., user's home).

Thus, the automatic memory cloud may transfer data to other devices within the memory cloud transparently without user interaction. By limiting the transfer of data to devices within a geographic location (e.g., the user's home) making up the memory cloud, the data may not travel outside to public networks where the data may be targeted by malefactors.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an automatic memory cloud program 110a. The networked computer environment 100 may also include a server 112 that is enabled to run an automatic memory cloud program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the automatic memory cloud program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the automatic memory cloud program 110a, 110b (respectively) to automatically move data within a local cloud between connected devices to more efficiently utilize collective storage capacity and move data to devices better suited for the specific type of data. The automatic memory cloud method is explained in more detail below with respect to FIG. 2.

Figure 2:
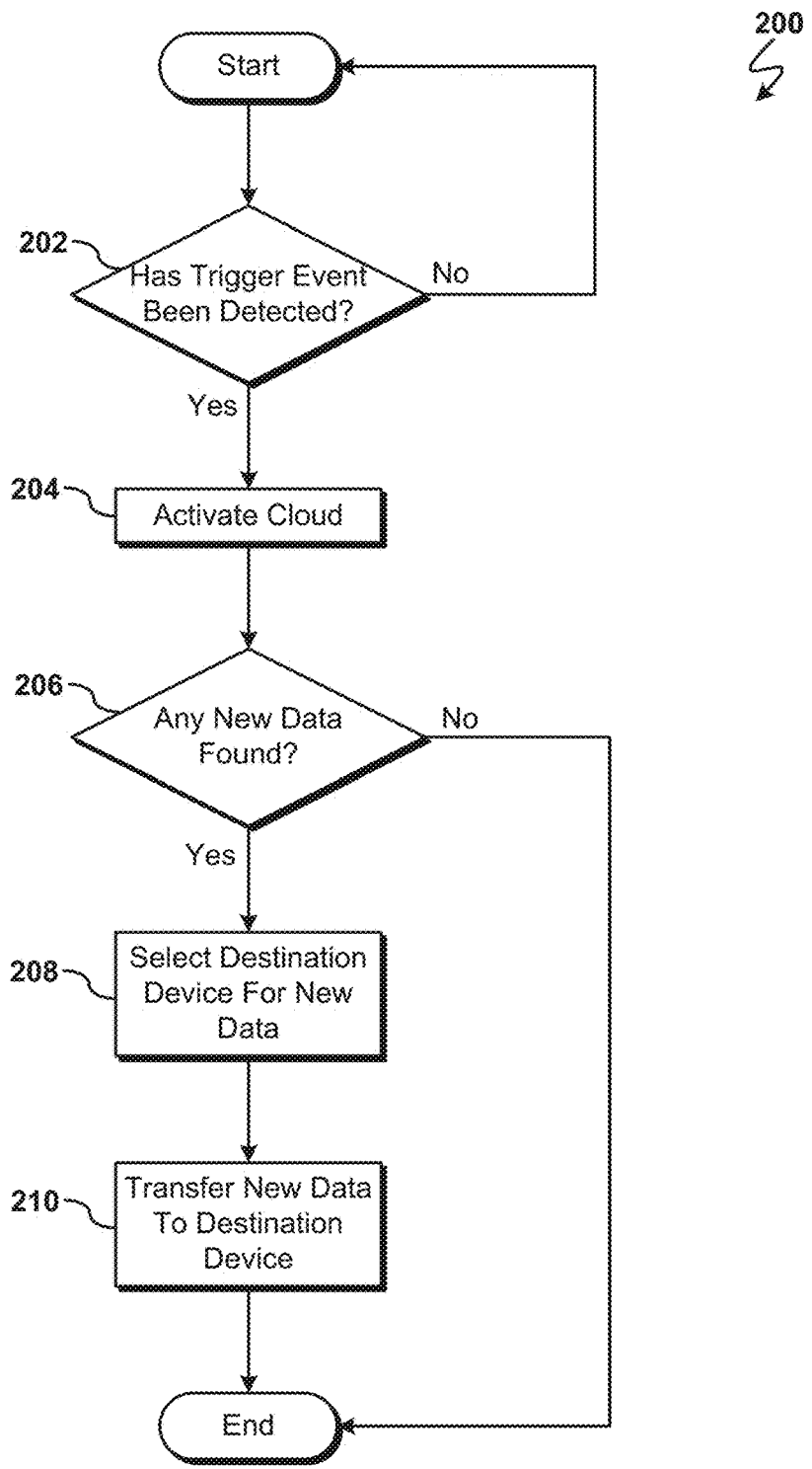
FIG. 2 is an operational flowchart illustrating a process for automatically relocating data within a memory cloud according to at least one embodiment.

Referring now to FIG. 2, an operational flowchart illustrating the exemplary process 200 for automatically relocating data within a personalized cloud used by the automatic memory cloud program 110a and 110b (FIG. 1) according to at least one embodiment is depicted.

At 202, it is determined if a trigger event has been detected. According to at least one embodiment, a primary device may be designated and used to activate the memory cloud after the primary device joins the network associated with the memory cloud. The user may designate an electronic device used by the user, such as the user's personal smartphone, as the primary device. The primary device may be used to trigger the memory cloud to activate via a predefined trigger event. The trigger event may start the memory cloud and the trigger event may be defined by the user to react to the primary device as will be described below.

When the primary device joins the network associated with the memory cloud (e.g., personal network at the user's home), the primary device may broadcast the primary device's availability on the network with a set of keys assigned to the primary device. The other devices already on the network (i.e., secondary devices) may then activate and respond to the broadcast by indicating the secondary devices are available to send or receive new data. Each device registered to the memory cloud may have a set of keys indicating what devices may interact with each other. For example, device $D_1$ may join a network associated with a memory cloud having keys $K_A$ and $K_B$. Also on the network are devices $D_2$, $D_3$, and $D_4$. If $D_2$ has a matching key for $K_A$ and $D_3$ has a matching key for $K_B$, $D_1$ may send data to, or receive data from, either device $D_2$ or $D_3$ since $D_1$ has matching keys. However, $D_4$ having key $K_C$ may not share data with $D_1$ since $D_1$ does not have a matching key for $K_C$. Thus, the secondary devices that have keys matching the primary device may constitute the devices within a memory cloud, as those secondary devices and the primary device have matching keys and may share data.

According to at least one embodiment, the user may define a proximity-based trigger event, whereby the memory cloud may become active once the primary device (e.g., smartphone) enters within a designated geographic region. For example, the user may define the proximity-based trigger event to activate the memory cloud when the primary device enters the user's home. The proximity of the primary device may be determined, for instance, by generating an indicator in response to the primary device connecting to the user's home router over wifi or by defining an area of global positioning system (GPS) coordinates and generating an indicator when the primary device's GPS coordinates are within the defined area.

According to at least one other embodiment, the trigger event may be defined by the user to trigger when the primary device's internal storage capacity reaches a predefined threshold value. For example, the user may define the trigger event to activate the memory cloud when the user's smartphone has less than 15% of internal storage available.

It may be appreciated that other trigger events may be defined and a combination of trigger events may be used to activate the memory cloud.

Additionally, the user may define trigger events and designate the primary device through a program that may have an interface (e.g., a graphical user interface) that the user may interact with prior to running the automatic memory cloud program 110a and 110b (FIG. 1) or that may be a part of the automatic memory cloud program 110a and 110b (FIG. 1). For example, a memory cloud setup program may provide a user interface that allows the user to choose from multiple redefined trigger event templates that may take some additional user information to complete, such as a user-selected percentage of remaining storage space on the primary device that will be the threshold value to initiate a trigger event (e.g., 15%). The program may also present the user with choices to select which device to use as the primary device, such as to select the current device the user is running the program from, or select the device from a list of available devices, etc.

If it was determined at 202 that a trigger event has not been detected, then the process 200 may return to the start to continue checking for a trigger event.

However, if it is determined that the trigger event has been detected at 202, then the memory cloud is activated at 204. According to at least one embodiment, if the trigger event occurred (e.g., the primary device entered within a designated geographic area), the memory cloud may be activated. The memory cloud may be administered by a computer (e.g., 102 (FIG. 1)) local to the memory cloud (e.g., the user's personal computer located in the user's home), or by an off-site server (e.g., 112 (FIG. 1) that may be run by a third-party) that handles data distribution within the memory cloud while maintaining data privacy, etc.

According to at least one embodiment, the primary device may transmit an indicator to the electronic device administering the memory cloud (e.g., a personal computer) to activate the memory cloud (e.g., upon determining that the primary device's available storage capacity has fallen below the threshold value). According to at least one other embodiment, the automatic memory cloud program 110a and 110b (FIG. 1) may run on the electronic device administering the memory cloud and may detect the trigger event at 202 and activate the memory cloud.

Then, at 206, it is determined if any new data is found on the primary device. According to at least one embodiment, new data on a device may be detected using known methods. According to at least one implementation, the primary device's data may be queried to determine the time when the data was created or modified (e.g., by reading a timestamp) and comparing that time to the last time the primary device was connected to the memory cloud. It may be appreciated that other known methods may be employed to determine new data such as scheduled scans of the data, comparing the data on the device to a snapshot of the primary device's data taken the last time the primary device was connected to the memory cloud, flagging any new data since the last time the primary device was connected to the memory cloud, etc.

Additionally, new data may also be analyzed to determine what type of new data was found (e.g., pictures, movies, recipes, eBook, etc.) and if the data may be suitable for transferring to another device in the memory cloud (e.g., configuration files specific to the primary device may not be appropriate for transferring while photographs may be appropriate for transferring). New data may be analyzed using known methods such as detecting a file extension (e.g., a ".jpg" extension may indicate a picture), or some other method, or a combination of methods. New data that is determined to be suitable for transferring to another device within the memory cloud may be assigned an identifier (e.g., keyword or tag) based on the analysis performed on the data file previously to mark what type of data the newly found data includes (e.g., pictures, movies, recipes, eBook, etc.).

If it was determined that new data was found on the primary device at 206, then a destination device for the new data is selected at 208. According to at least one embodiment, prior to the process 200 running, during initialization of the memory cloud, the devices making up the memory cloud may be identified and added to the memory cloud. The user may be presented with an interface that allows the user to add devices to the memory cloud with network connection capability, such as a smart television, tablet computer, digital picture frame, security camera system, etc. Furthermore, the user may also assign tags or other descriptors to each added device to indicate the device's intended usage. For example, the user may add a tablet to the memory cloud that the user often uses in the kitchen to look up recipes. Thus, the user may tag the tablet with tags such as "kitchen" and/or "recipes" to indicate the intended usage of the tablet.

According to at least one other embodiment, the devices making up the memory cloud may be automatically detected (e.g., by identifying all devices connected to the user's home wifi network). Determining the usage of each device may be obtained by identifying a hardware identifier and looking up what type of hardware device corresponds to the hardware identifier. For example, reading a hardware identifier and determining that the device is a digital picture frame which may indicate that the device is suitable for digital pictures or movies.

According to yet another embodiment, the usage history of the devices making up the memory cloud may be tracked to determine how the user uses each device. For example, the user may frequently look at recipes on their tablet. Thus, based on the historical usage of the tablet, the tablet may be tagged for recipes and related data. Furthermore, by continuously updating usage history, if the usage of a device changes at some point, the device may automatically be retagged to a different usage. For example, the tablet that was previously used for recipes by a parent in a family, may now be used primarily to watch movies after the tablet is passed on to a child within the family.

Based on information related to the devices identified as part of the memory cloud and the identifier(s) assigned to the new data files, a device is selected as the destination for the new data found on the primary device. Information related to the devices within the memory cloud may include the identified usage of the device (e.g., for viewing movies) as well as the amount of free storage space available on the device. The information related to the devices within the memory cloud may then be matched to the identifier assigned to the new data along with the size of the data file (e.g., as expressed in megabytes, gigabytes, etc.).

For example, the primary device may have a new 550 megabyte movie file detected after the memory cloud is activated. The memory cloud may include a tablet tagged for recipes with 10 gigabytes of free storage space, a smart television tagged for movies and pictures with 1 gigabyte of free storage space, and a digital picture frame tagged for pictures and movies with 350 megabytes of free storage space. Out of the available devices within the memory cloud, the smart television may be selected as a destination for the new 550 megabyte movie file since the smart television is tagged for movies and has adequate storage space available to accommodate the movie file.

If it is determined that there is not enough available memory storage available in any devices within the memory cloud for the new data, smart analytics may be used to suggest data that may be deleted in order to free up enough space within the target device to transfer the new data. For example, if the all devices in the personal cloud have less than 300 megabytes available and the new data file is a 350 megabyte movie file, smart analytics may be used to determine 350 megabytes of data on a device that may not have been used recently or otherwise may safely be deleted to make room for storing the new data file.

However, if it was determined that no new data is found on the primary device at 206, then the process 200 will end.

Then, at 210, the new data is transferred to the selected destination device within the memory cloud. According to at least one embodiment, the new data found at 206 may be transferred to the device selected at 208 over the network connection (e.g., wifi) connecting the devices within the memory cloud. The entity administering the memory cloud (e.g., user's personal computer) may send instructions to the primary device to transfer the data from the primary device to the destination device. Once the new data has been transferred to the selected destination device, the data may be removed from the originating device (e.g., primary device) to free up storage space on the originating device. Since the process 200 may occur automatically without any user interaction, a log entry may be added to a file transfer log indicating file transfer information such as the device the new data was sent to and a timestamp indicating when the file transfer occurred. Thus, the user may view the file transfer log to determine which device may be currently storing the new data that was transferred.

According to at least one other embodiment, new data may be found on a device within the memory cloud and automatically be transferred to the primary device (i.e., the primary device may be the destination device). For example, a security system device or a weather station device may be connected to the memory cloud and generate new data, such as security camera video saved and tagged in response to detecting anomalous activity, or weather station data (e.g., temperature and humidity). The primary device may be tagged to indicate that the user uses the primary device for security data and weather data. Thus, when the process 200 executes, the security system or weather station may be scanned for new data, as described previously at 206. Based on the identifiers assigned to the security footage or weather station data when new data is found, and the tagged usage of the primary device, the primary device may be selected as the destination device at 208. Then the new data may be transferred to the primary device at 210 if the primary device has sufficient free storage space.

It may be appreciated that FIG. 2 provide only an illustration of one embodiment and does not imply any limitations with regard to how different embodiments may be implemented. Many modifications to the depicted embodiment(s) may be made based on design and implementation requirements. According to at least one other embodiment, the user may assign permissions to the data that may be distributed within the memory cloud. An interface for an application may provide options to the user to select, for instance, that data has a family permission (that the data may be available to anyone in the house) or personal permission (that the data would not be available/visible to anyone other than the user). Thus the user may allow data to be spread to the memory cloud without making it available to all users. For example, an application on the user's smartphone primary device (e.g., an application that interfaces with the automatic memory cloud program 110a and 110b (FIG. 1)) may provide a graphical user interface that allows a user to select data that would be distributed within the memory cloud and select a permission level to be associated with the data. For example, a user may have a recipe for a birthday meal that the user wishes to keep secret via permissions in order to not spoil the surprise to others by allowing other people to see the recipe before the meal has been prepared.

Figure 3:
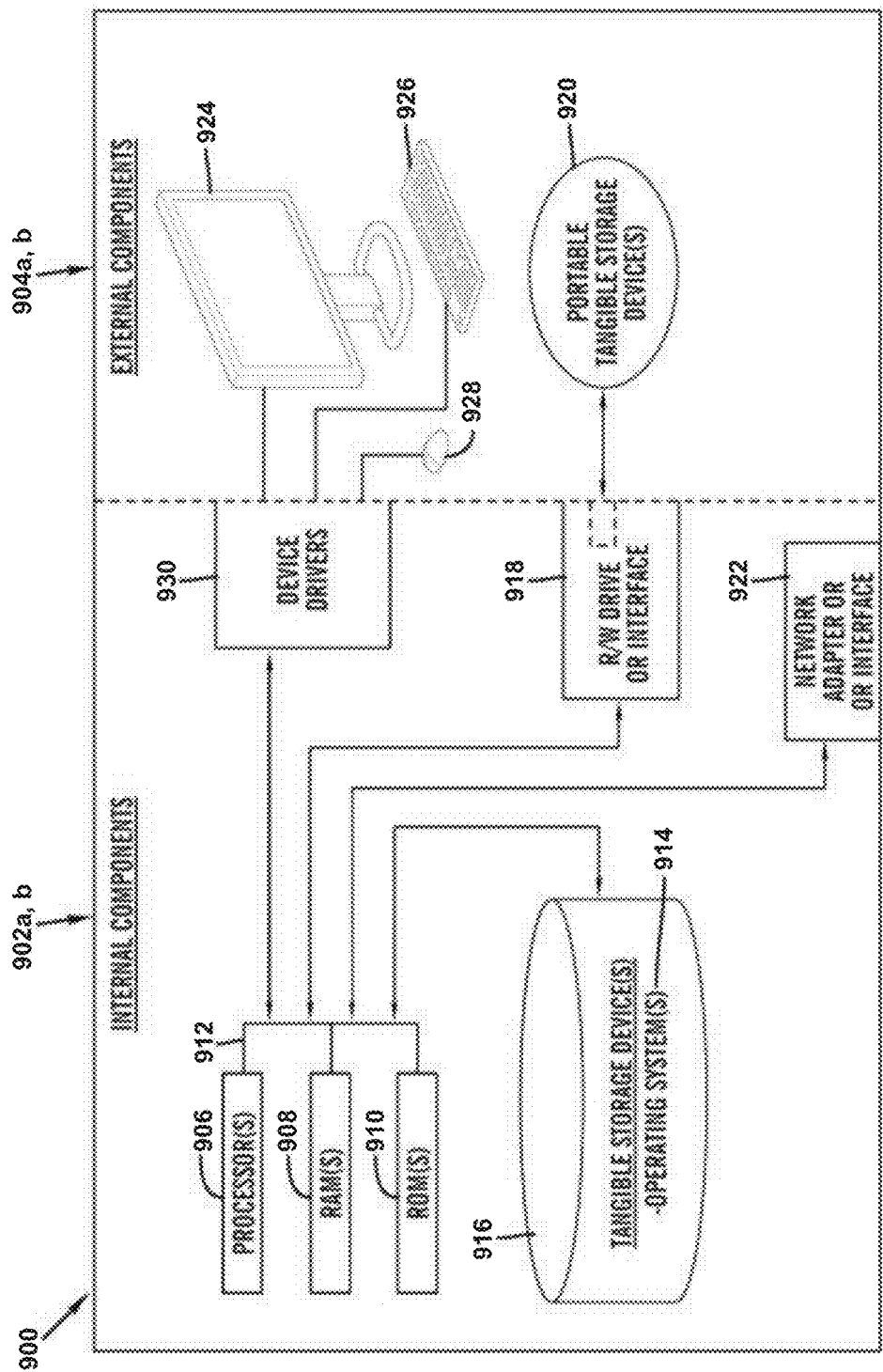
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the automatic memory cloud program 110a (FIG. 1) in client computer 102 (FIG. 1) and the automatic memory cloud program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the automatic memory cloud program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wifi interface cards, or 3G or 4G wireless interface cards or other wired or wireless communication links. The software program 108 (FIG. 1) and the automatic memory cloud program 110a (FIG. 1) in client computer 102 (FIG. 1) and the automatic memory cloud program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the automatic memory cloud program 110a (FIG. 1) in client computer 102 (FIG. 1) and the automatic memory cloud program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
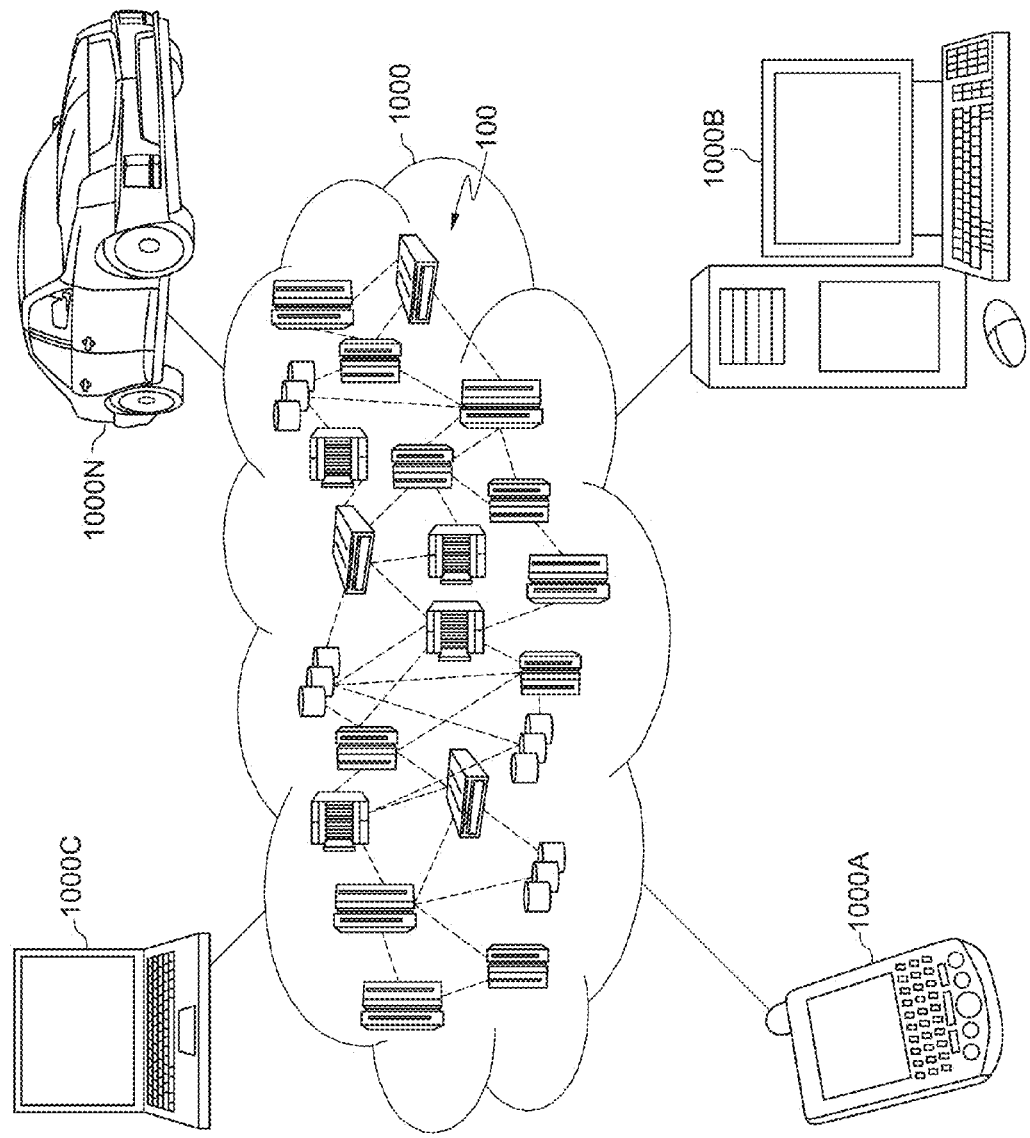
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
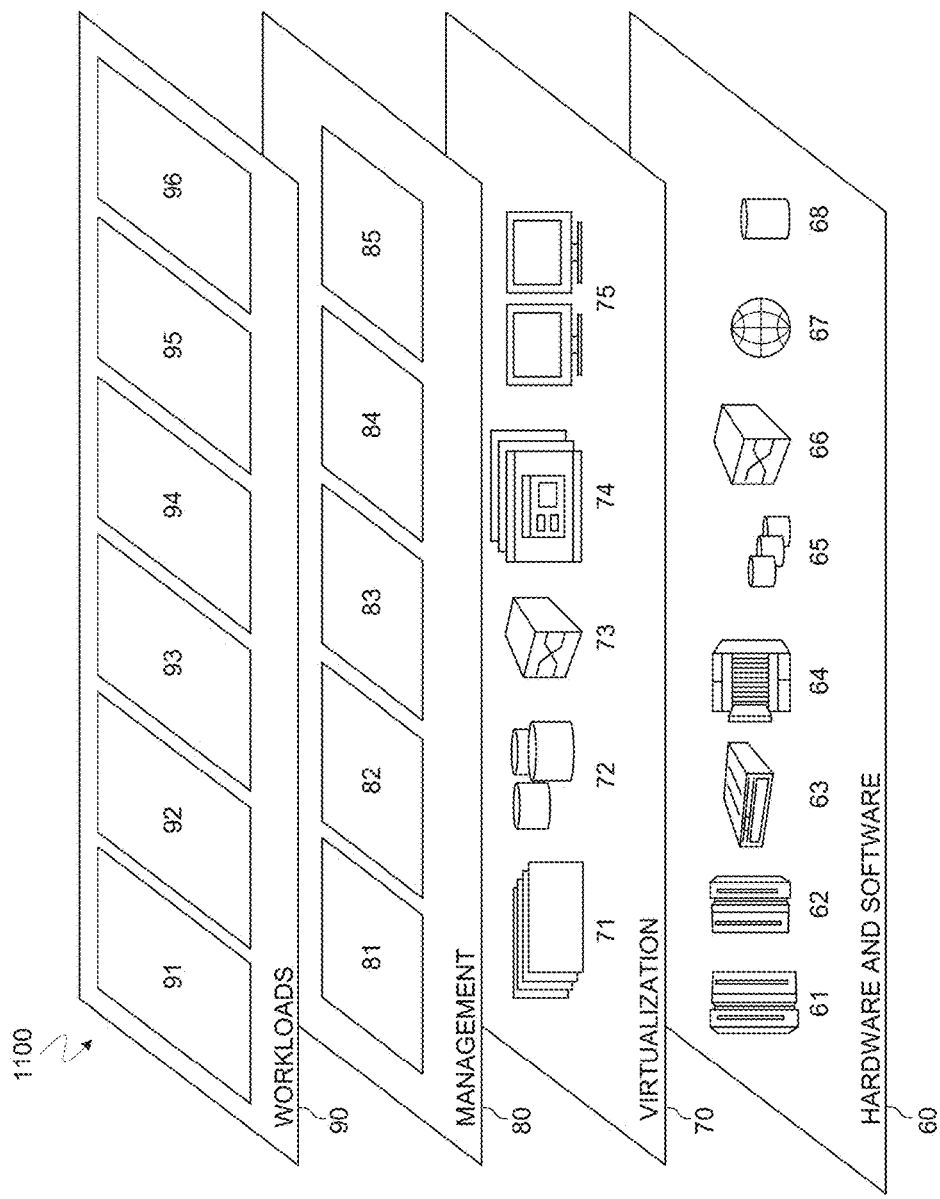
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic memory cloud 96. An automatic memory cloud program 110a, 110b (FIG. 1) provides a way to automatically move data within a local cloud between connected devices to more efficiently utilize collective storage capacity and move data to devices better suited for the specific type of data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for an automatic memory cloud, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   detecting a trigger event, wherein the trigger event comprises detecting the primary device is within a designated geographic region;
   activating the automatic memory cloud based on detecting the trigger event;
   determining if new data is found on a primary device connected to the activated automatic memory cloud, wherein the new data has a data type and a data size;
   selecting a destination device from within a plurality of secondary devices connected to the activated automatic memory cloud based on determining that the new data is found on the primary device, wherein the selected destination device has i) an available storage exceeding the data size and ii) a usage type associated with the selected destination device matches the data type associated with the new data, wherein determining the usage type of each secondary device within the determined plurality of secondary devices comprises analyzing a plurality of historical usage data corresponding to each secondary device within the determined plurality of secondary devices, wherein the plurality of historical usage data includes data derived from at least one user interaction with each secondary device within the determined plurality of secondary devices, and wherein the data derived from the at least one user interaction corresponds with a category of a data file the user accessed during the at least one user interaction; and
   sending an instruction to transfer the new data from the primary device to the selected destination device.

2. The computer system of claim 1, further comprising:
   determining the plurality of secondary devices connected to the automatic memory cloud;
   determining the usage type of each secondary device within the determined plurality of secondary devices; and
   determining the available storage of each secondary device within the determined plurality of secondary devices.

3. The computer system of claim 1, further comprising:
   receiving a plurality of user preferences from a user, wherein the plurality of user preferences includes at least one of a primary device indicator corresponding to the primary device, a plurality of secondary device indicators corresponding to the plurality of secondary devices, and the usage type of each secondary device within the plurality of secondary devices.

4. The computer system of claim 1, wherein detecting the trigger event comprises determining that the primary device caused the trigger event.

5. The computer system of claim 1, further comprising:
   generating a log entry associated with a log on the primary device, wherein the log entry includes a destination device indicator corresponding to the destination device and a timestamp indicating when the new data was transferred to the destination device.

6. The computer system of claim 2, wherein determining the usage type of each secondary device within the determined plurality of secondary devices comprises a user-provided usage tag corresponding to each secondary device within the determined plurality of secondary devices.

7. The computer system of claim 1, wherein sending the instruction to transfer the new data from the primary device to the destination device comprises the primary device sending a copy of the new data to the destination device through the automatic memory cloud and the primary device deleting the new data from the primary device.

8. A computer program product for an automatic memory cloud, comprising:
   one or more computer-readable storage medium and program instructions stored on at least one of the one or more tangible storage medium, the program instructions executable by a processor, the program instructions comprising:
   program instructions to detect a trigger event, wherein the trigger event comprises detecting the primary device is within a designated geographic region;
   program instructions to activate the automatic memory cloud based on detecting the trigger event;
   program instructions to determine if new data is found on a primary device connected to the activated automatic memory cloud, wherein the new data has a data type and a data size;
   program instructions to select a destination device from within a plurality of secondary devices connected to the activated automatic memory cloud based on determining that the new data is found on the primary device, wherein the selected destination device has i) an available storage exceeding the data size and ii) a usage type associated with the selected destination device matches the data type associated with the new data, wherein determining the usage type of each secondary device within the determined plurality of secondary devices comprises analyzing a plurality of historical usage data corresponding to each secondary device within the determined plurality of secondary devices, wherein the plurality of historical usage data includes data derived from at least one user interaction with each secondary device within the determined plurality of secondary devices, and wherein the data derived from the at least one user interaction corresponds with a category of a data file the user accessed during the at least one user interaction; and
   program instructions to send an instruction to transfer the new data from the primary device to the selected destination device.

9. The computer program product of claim 8, further comprising:
   program instructions to determine the plurality of secondary devices connected to the automatic memory cloud;
   program instructions to determine the usage type of each secondary device within the determined plurality of secondary devices; and
   program instructions to determine the available storage of each secondary device within the determined plurality of secondary devices.

10. The computer program product of claim 8, further comprising:
    program instructions to receive a plurality of user preferences from a user, wherein the plurality of user preferences includes at least one of a primary device indicator corresponding to the primary device, a plurality of secondary device indicators corresponding to the plurality of secondary devices, and the usage type of each secondary device within the plurality of secondary devices.

* * * * *